United States Patent
Huang et al.

(10) Patent No.: US 10,814,267 B2
(45) Date of Patent: Oct. 27, 2020

(54) FAKE HEAD ASSEMBLY

(71) Applicants: BOE Technology Group Co., Ltd., Beijing (CN); Hefei BOE Optoelectronics Technology Co., Ltd., Anhui (CN)

(72) Inventors: Yangyang Huang, Beijing (CN); Jieqiang Tan, Beijing (CN); Kun Liu, Beijing (CN); Zixiang Lv, Beijing (CN); Fei Fang, Beijing (CN); Ziyu Meng, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 764 days.

(21) Appl. No.: 15/647,507

(22) Filed: Jul. 12, 2017

(65) Prior Publication Data
US 2018/0021718 A1   Jan. 25, 2018

(30) Foreign Application Priority Data
Jul. 22, 2016   (CN) .......................... 2016 1 0585107

(51) Int. Cl.
*B01D 53/047* (2006.01)
*B01D 53/04* (2006.01)

(52) U.S. Cl.
CPC ..... *B01D 53/0476* (2013.01); *B01D 53/0407* (2013.01); *B01D 2259/40011* (2013.01)

(58) Field of Classification Search
CPC ............ B01D 53/0476; B01D 53/0407; B01D 2259/40011
See application file for complete search history.

(56) References Cited

U.S. PATENT DOCUMENTS

| 5,545,946 A * | 8/1996 | Wiemann | H01J 1/3042 |
| | | | 313/306 |
| 6,858,981 B2 * | 2/2005 | Cho | B82Y 10/00 |
| | | | 313/309 |

(Continued)

FOREIGN PATENT DOCUMENTS

| CN | 201060346 Y | 5/2008 |
| CN | 202151009 U | 2/2012 |

(Continued)

OTHER PUBLICATIONS

First Office Action, including Search Report, for Chinese Patent Application No. 201610585107.6, dated Nov. 27, 2018, 7 pages.

*Primary Examiner* — Joseph L Williams
(74) *Attorney, Agent, or Firm* — Westman, Champlin & Koehler, P.A.

(57) ABSTRACT

The present disclosure relates a fake head assembly including a fake head body having an engage face, a first vacuum suction hole configured to be connected to an evacuating device to perform an evacuation, an adsorption portion having an adsorption surface, a plurality of first vacuum holes inside the fake head body, each first vacuum hole including a first end on the adsorption surface and a second end on the engage face, the plurality of first vacuum holes being arranged in order in a first direction of the fake head assembly; a shunt device detachably connected to the fake head body, the shunt device having a plurality of evacuating slots which extend in the first direction and have different extension lengths; the first vacuum suction hole being closable by the shunt device and selectively communicated with one evacuating slot, so as to be communicated the second end of at least some of the first vacuum holes via the one evacuating slot; and a connecting device for connecting the shunt device to the engage surface of the fake head body.

10 Claims, 6 Drawing Sheets

(56) References Cited

U.S. PATENT DOCUMENTS

| | | | | |
|---|---|---|---|---|
| 7,309,954 B2* | 12/2007 | Song | ............... | H01J 29/028 |
| | | | | 313/293 |
| 7,382,089 B2* | 6/2008 | Oh | ............... | B82Y 10/00 |
| | | | | 313/466 |
| 7,701,137 B2* | 4/2010 | DiSanto | ............... | H01J 7/18 |
| | | | | 313/495 |

FOREIGN PATENT DOCUMENTS

| | | |
|---|---|---|
| CN | 202160345 U | 3/2012 |
| CN | 105093459 A | 11/2015 |

* cited by examiner

FAKE HEAD ASSEMBLY

CROSS-REFERENCE TO RELATED APPLICATION

This application claims the benefit of Chinese Patent Application 201610585107.6 filed on Jul. 22, 2016 in the State Intellectual Property Office of China, the whole disclosure of which is incorporated herein by reference.

TECHNICAL FIELD

The present disclosure relates to the field of display devices, and specifically to a fake head assembly.

DESCRIPTION OF THE RELATED ART

At present, in a TFT Module Process, during a pre-bonding (Pre-Bonding) implemented by a TFOG machine for Out Lead Bonding (OLB), it is necessary to use a fake head to adsorb a flexible circuit board. However, as existing fake head is integrated and its adsorption length is constant, the fake head should be changed in accordance with a length of the flexible circuit board when the type (length) of the flexible circuit board is changed, which is disadvantage of improving working efficiency and equipment utilization.

SUMMARY

It is at least an object of the present disclosure to provide a fake head assembly whose adsorption length is adjustable.

To achieve the object, there is provided a fake head assembly, comprising a fake head body having an engage face, a first vacuum suction hole configured to be connected to an evacuating device to perform an evacuation, an adsorption portion having an adsorption surface, a plurality of first vacuum holes inside the fake head body, each first vacuum hole including a first end on the adsorption surface and a second end on the engage face, the plurality of first vacuum holes being arranged in order in a first direction of the fake head assembly; a shunt device detachably connected to the fake head body, the shunt device having a plurality of evacuating slots which extend in the first direction and have different extension lengths; the first vacuum suction hole being closable by the shunt device and selectively communicated with one evacuating slot, so as to be communicated the second end of at least some of the first vacuum holes via the one evacuating slot; and a connecting device for connecting the shunt device to the engage surface of the fake head body.

The fake head body further comprises at least one additional vacuum hole extending between the adsorption surface and a wall of the first vacuum suction hole.

The shunt device further comprises a shunt rod having a plurality of prismatic faces, at least some of which are provided with evacuating slots of different lengths.

The shunt device is provided with a plurality of the shunt rods and the fake head body is selectively connected to one of the plurality of shunt rods.

The connecting device further comprises a shunt connector detachably arranged between the engage surface of the fake head body and the shunt device; and the shunt connector comprises a second vacuum suction hole aligned with the first vacuum suction hole, the second vacuum suction hole serving for communicating the first vacuum suction hole with the evacuating slot; a plurality of second vacuum holes aligned with the plurality of first vacuum holes one by one, the plurality of second vacuum holes serving for communicating the evacuating slot with the first vacuum holes; a first fastening portion for detachably fastening with the fake head body; and a second fastening portion for detachably fastening with the shunt device.

Further, an elongate channel for mounting the shunt device is provided on the surface of the shunt connector which faces the shunt device.

The connecting device further comprises a gasket mounted in the elongate channel to support the shunt device, the gasket comprising: a first side facing the elongate channel and a second side opposite the first side; a trapezoidal support channel provided on the second side of the elongate channel so as to be fitted with the shunt device; a third vacuum suction hole aligned with the second vacuum suction hole, the third vacuum suction hole serving for communicating the second vacuum suction hole with the evacuating slot; a plurality of third vacuum holes aligned with respective second vacuum holes of the shunt connector one by one, the plurality of third vacuum holes serving for communicating the evacuating slot with the second vacuum holes.

Further, the first vacuum suction hole, the second vacuum suction hole and the third vacuum suction hole comprise a plurality of through holes arranged in order in the first direction.

Further, the first vacuum suction hole is arranged in the middle part of the false head body and the additional vacuum hole(s) is(are) interposed in the middle of the plurality of first vacuum holes in the first direction.

Further, the false head body comprises a substantially rectangular body which has a first surface, a second surface opposite to the first surface, and a third surface between the first surface and the second surface, and the engage surface forms at least a part of the second surface, the adsorption portion projects outwardly from the third surface, and the adsorption surface is perpendicular to the engage surface.

BRIEF DESCRIPTION OF THE DRAWINGS

The objects, advantages and features of the fake head assembly of the present disclosure will become more apparent from the following detailed description of embodiments of the present disclosure, given by way of non-limiting example and the embodiments of the present disclosure illustrated in the accompanying drawings, in which:

FIG. 1b is a top view of the embodiment of FIG. 1a;

FIG. 2a is a top view of the fake head body in the embodiment of FIG. 1a;

FIG. 2d is a bottom view of the embodiment of FIG. 2a;

FIG. 3a is a top view of the shunt connector in the embodiment of FIG. 1a;

FIG. 4a is a top view of the shunt block in the embodiment of FIG. 1a;

FIG. 4c is a side view of the embodiment of FIG. 4a;

DETAILED DESCRIPTION OF PREFERRED EMBODIMENTS

Figure 1A:
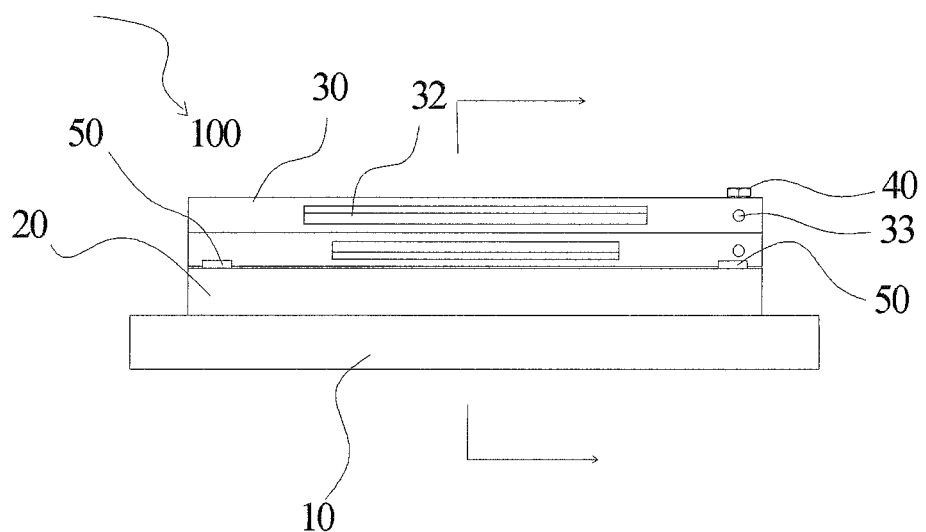
FIG. 1a shows a side view of a fake head assembly according to an embodiment of the present disclosure.

The technical solution of the present disclosure will be described in further detail with reference to the following examples, taken in conjunction with the accompanying drawings. In the description, the same or similar reference numerals indicate the same or similar parts. The following description of the embodiments of the present invention with reference to the accompanying drawings is intended to explain the general inventive concept of the present application and should not be construed as limiting the present disclosure.

In addition, in the following detailed description, for ease of explanation, numerous specific details are set forth in order to provide a thorough understanding of the disclosed embodiments. It will be apparent, however, that one or more embodiments may also be implemented without these specific details. In other instances, well-known structures and devices are illustrated by way of illustration to simplify the drawings.

According to a generally technical concept of the present disclosure, there is provided a fake head assembly, comprising a fake head body having an engage face, a first vacuum suction hole configured to be connected to an evacuating device to perform an evacuation, an adsorption portion having an adsorption surface, a plurality of first vacuum holes inside the fake head body, each first vacuum hole including a first end on the adsorption surface and a second end on the engage face, the plurality of first vacuum holes being arranged in order in a first direction of the fake head assembly; a shunt device detachably connected to the fake head body, the shunt device having a plurality of evacuating slots which extend in the first direction and have different extension lengths; the first vacuum suction hole being closable by the shunt device and selectively communicated with one evacuating slot, so as to be communicated the second end of at least some of the first vacuum holes via the one evacuating slot; and a connecting device for connecting the shunt device to the engage surface of the fake head body.

Figure 1B:
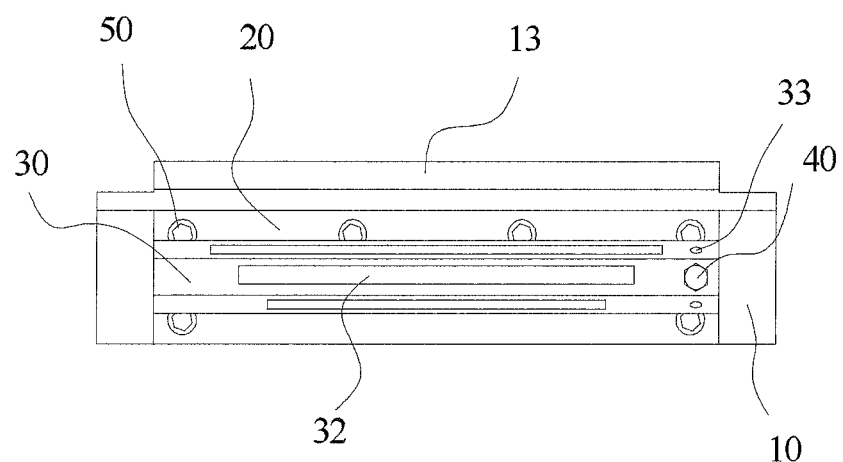
Figure 1C:
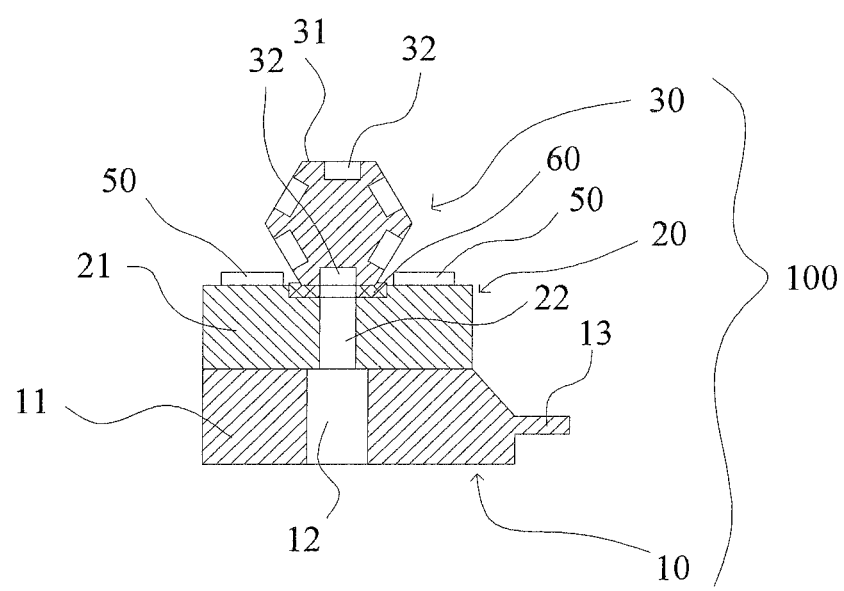
FIG. 1c is a cross-sectional view of the embodiment of FIG. 1a taken along the line E-E.

FIGS. 1a-1c show a fake head assembly according to an embodiment of the present disclosure. The fake head assembly includes a fake head body 10, a shunt device detachably connected to the fake head body 10, and a connecting device for connecting the shunt device to the fake head body 10.

In the present embodiment, as shown in FIGS. 2a-2d, the fake head body 10 has a body which is, for example, in a form of a substantially rectangular body 11, but it may have any other suitable shape. The rectangular body 11 has a first surface, a second surface opposite to the first surface, and a third surface between the first surface and the second surface.

The fake head body 10 has an engage surface formed as at least a part of the second surface for connecting with the connecting device and then with the shunt device. The fake head body 10 also has a first vacuum suction hole 12 for connecting with an evacuating device to perform evacuating. In the present embodiment, the first vacuum suction hole 12 may be rectangular, circular, oval or any other suitable shape. It is to be understood that the first vacuum suction hole 12 may also be in any other suitable form, for example, the first vacuum suction hole 12 may include a plurality of through holes arranged in order in the longitudinal direction of the false head assembly 100. In an alternative embodiment, a thin portion thinner than the other portions may be provided in the middle part of the fake head body 10, so that a plurality of through holes are arranged on the thin portion at intervals in the longitudinal direction of the fake head body 10. The thin portion may be formed, for example, in such a manner that the first surface is recessed inwardly to form a first recess, the second surface is also recessed inwardly to form a second recess opposite to the first recess, and the bottoms of the first and second recesses forms both sides of the thin portion.

The fake head body 10 also has an adsorption portion 13 and a plurality of first vacuum holes 16 extending inside the fake head body 10. The adsorption portion 13 has an adsorption surface, and the adsorption portion 13 adsorbs, for example, a flexible circuit board through the adsorption surface. Optionally, the adsorption port 13 protrudes outwardly from the third surface, optionally, the protrusion direction of the adsorbent 13 is substantially parallel to the first and second surfaces, i.e., extends in the width direction of the fake head body in FIG. 2a so that the suction surface is arranged substantially perpendicular to the engage surface.

In the present embodiment, it is optional that each of the first vacuum holes 16 includes a first end located on the adsorption surface and a second end located on the engage surface, and the plurality of first vacuum holes 16 are arranged in order in the longitude direction of the fake head assembly. The extension paths of the first vacuum holes 16 may be the same or different, and their extension paths may be in any suitable form. For example, the first vacuum hole 16 may be formed by a first straight line segment extending from the engage surface in the thickness direction but no through to the first surface and a second straight line segment extending from the end of the first straight line segment inside the fake head body 10 to the adsorption surface in the width direction. Or the first vacuum hole 16 may be formed as a whole in any suitable shape such as a quarter arc shape, a curved shape.

Optional, the plurality of first vacuum holes 16 are arranged in intervals in the longitude direction of the fake head assembly 100. Optionally, in order to further enhance the adsorption strength, it is also possible to comprise at least one additional vacuum hole 18 extending between the adsorption surface and the wall of the first vacuum suction hole 12 such that as much as possible vacuum holes (including the first vacuum holes 16 and the additional vacuum hole 18) may be arranged in the longitude direction of the fake head assembly 100. Optionally, the additional vacuum holes 18 are in the form of a substantially linear through-hole, of course they can be any other suitable shape.

Figure 2A:
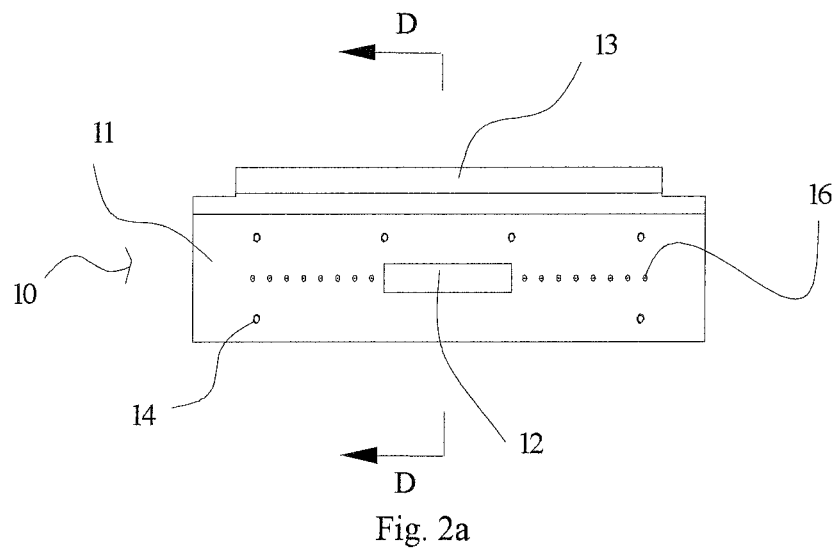
Figure 2B:
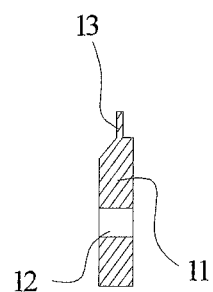
FIG. 2b is a cross-sectional view of the embodiment of FIG. 2a taken along the line D-D.
Figure 2C:
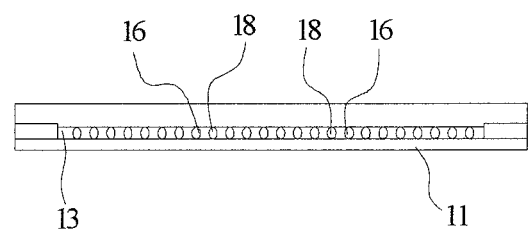
FIG. 2c is a side view of the embodiment of FIG. 2a in which the adsorption portion and a group of vacuum holes on its adsorption portion are shown.
Figure 2D:
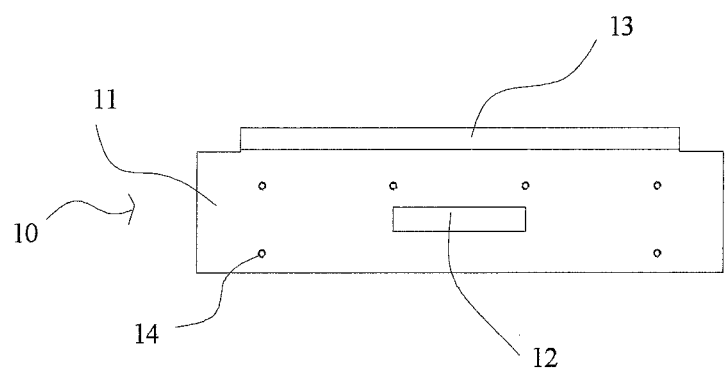

More specifically, there are sixteen first vacuum holes 16 in FIGS. 2a and 2c, and eight first vacuum holes 16 are arranged on both sides of the first vacuum suction hole 12 in the longitudinal direction, respectively. Further, as shown in FIG. 2c, eight additional vacuum holes 18 are provided between the two groups of eight first vacuum holes 16 on both sides of the suction surface. That is, eight first vacuum holes 16, eight additional vacuum holes 18 and eight first vacuum holes 16 are arranged in turn in the longitudinal direction. Although it is shown in FIG. 2c that the numbers of the first vacuum holes 16 on left, the first vacuum hole 16 on right, and the additional vacuum holes 18 in the middle are eight, it is to be understood that the numbers thereof may be any other suitable number. In addition, although their numbers are the same (eight), it should be understood that their numbers may be different, or the numbers of the first vacuum holes 16 on left (first group) and the first vacuum hole 16 (second group) on right may be the same while the number of additional vacuum holes 18 are different from those of the first vacuum holes on left or right. In addition, although additional vacuum holes 18 are present in the present embodiment, it should be understood that additional vacuum holes 18 may be dispensed without affecting the adsorption strength to the flexible circuit board, which doesn't depart from the scope of the present invention.

In addition, it should also be understood that, although the first vacuum suction hole 12 is located in the central position of the fake head body 10 in FIGS. 2a-2d, it should be understood that the first vacuum suction hole 12 may be located at any suitable position. Further, the number of first vacuum holes 16 located on both sides of the first vacuum suction hole 12 may vary with the change in the position of the first vacuum suction hole 12 and the first and second groups may be located on the same side of the first vacuum suction hole 12 when the first vacuum suction hole 12 is at the edge.

Figure 3A:
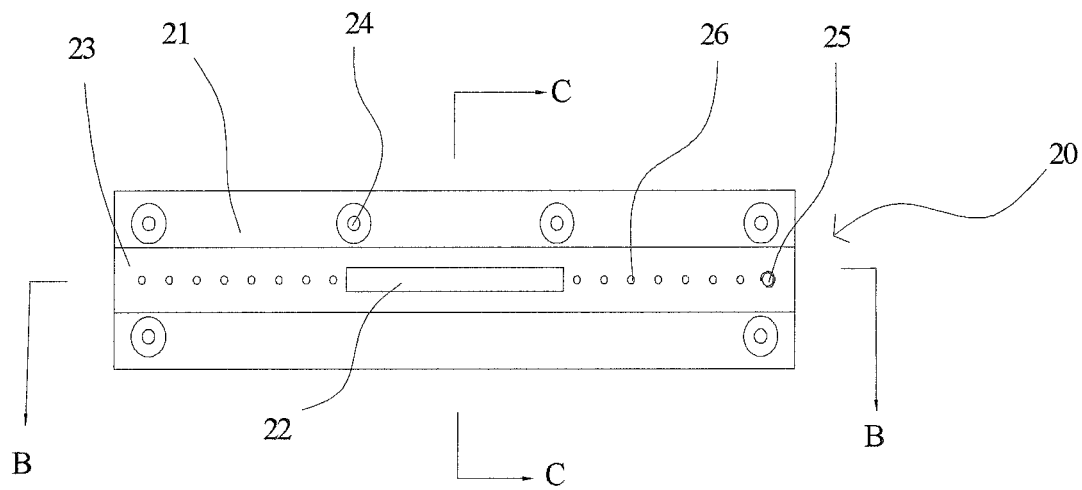
Figure 3B:
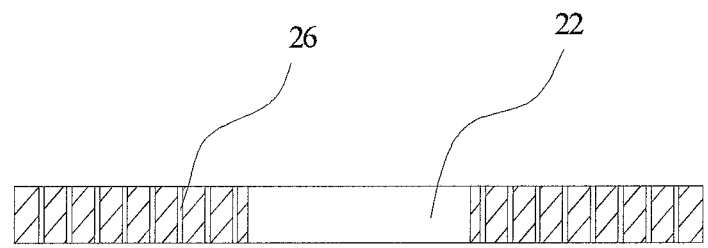
FIG. 3b is a cross-sectional view of the embodiment of FIG. 3a taken along the line B-B.
Figure 3C:
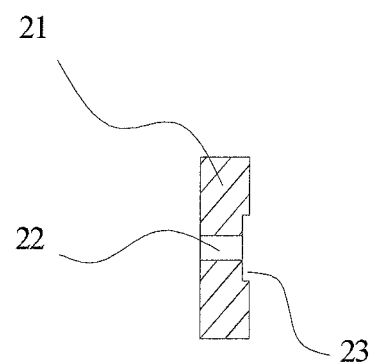
FIG. 3c is a cross-sectional view of the embodiment of FIG. 3a taken along the line C-C.
Figure 4A:
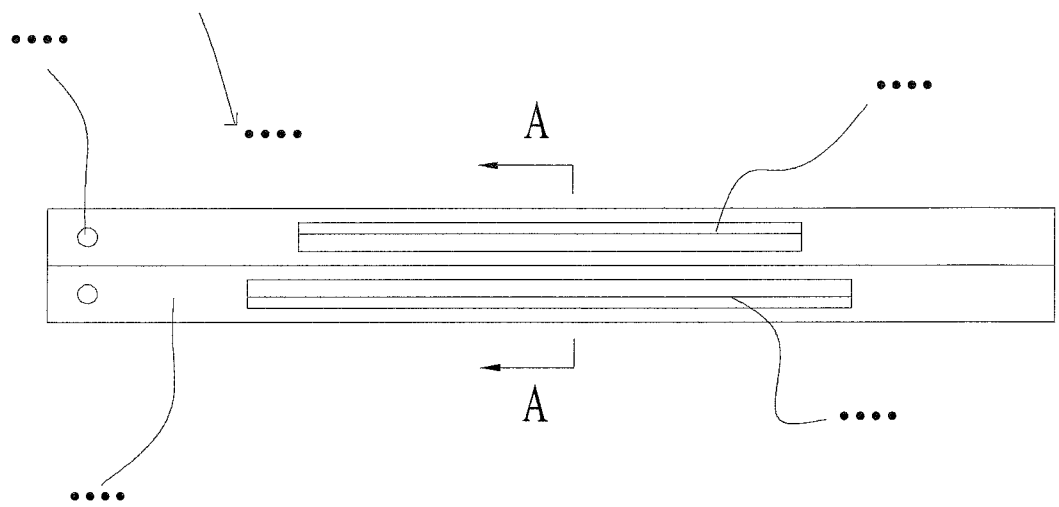
Figure 4B:
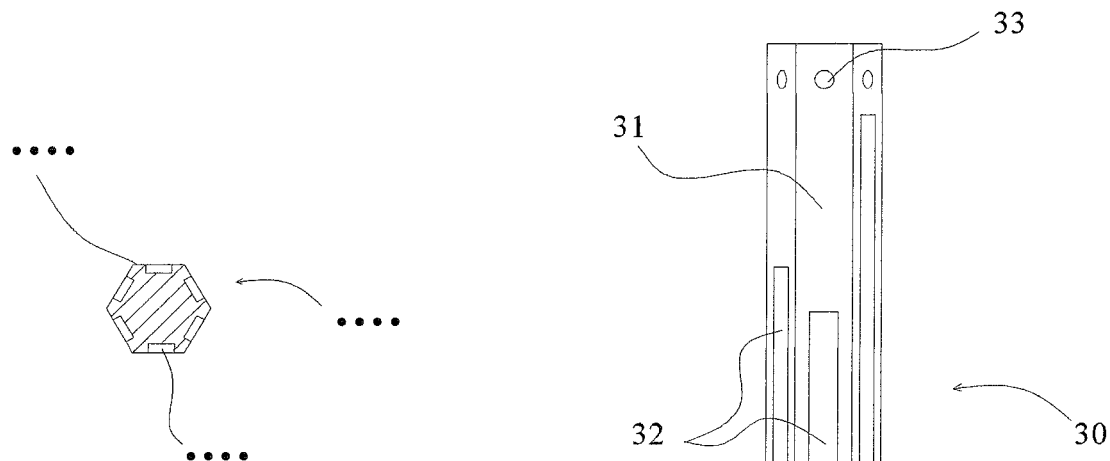
FIG. 4b is a cross-sectional view of the embodiment of FIG. 4a taken along the line A-A.
Figure 4C:
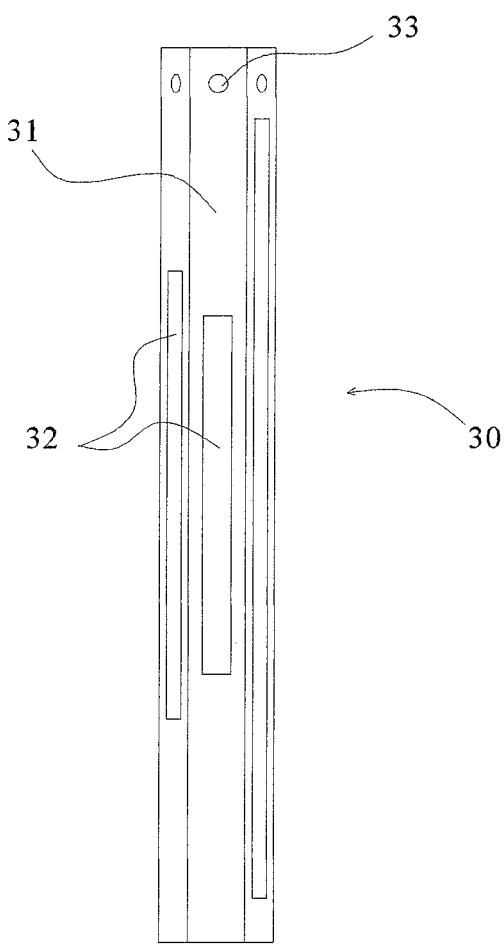

FIGS. 3a-3c show the connecting device including the shunt connector 20 in the present embodiment. FIGS. 4a-4c show a shunt device in the form of a shunt rod connected to the fake head body 10 by means of a connecting device in the present embodiment.

Optionally, FIGS. 4a-4c show a shunt rod 30 having a plurality of prismatic faces 31, at least some of which are provided with the evacuating slots 32 of different lengths. The first vacuum suction hole 12 can be capped by any one of the evacuating slots 32 and selectively communicated with the evacuating slots 32 through which the first vacuum suction hole 12 is communicated with the second end of at least some of the first vacuum holes 16. Those first vacuum holes 16 which are not communicated with the evacuating slots 32 are blocked by the prismatic faces 31 of the shunt rod 30 so as not to be evacuated. Thus the adsorption length of the adsorption surface (corresponding to the length of the flexible circuit board) corresponds to a distance between the outermost two of the first vacuum holes 16 which are communicated with the evacuating slots 32. Each of the evacuating slots 32 are correspondingly communicated with a different number of first vacuum holes 16 and each of the evacuating slots 32 is in communicated with all of the additional vacuum holes 18 and covers all of the additional vacuum holes 18. In this way, the shunt rod 30 may provide various lengths of the evacuating slots to accommodate different adsorption requirements and its structure is compact.

Optionally, the shunt device is equipped with a plurality of shunt rods 30, and each of the shunt rods 30 optionally comprises a plurality of prismatic faces, at least some of which are provided with evacuating slots 32 of different lengths. Optionally, the lengths of the evacuating slots 32 on each of the shunt rods 30 are different. It will be appreciated that the plurality of shunt rods 30 are used together as optional components of the fake head assembly 100 such that the fake head body 10 may be selectively connected with one of the shunt rods 30 according to the length of the flexible circuit board to be adsorbed without the need to change new fake head, which further expands the application scope of the fake head.

In FIGS. 4a-4c, it is shown that the shunt rod 30 is optionally in the form of a hexagonal prism having a regular hexagonal cross section, and the lengths of the evacuating slots 32 on the six prismatic faces 31 of the shunt rod 30 are different. For example, they may be increased in a predetermined length difference, and the length difference may be, for example, any suitable length difference of 2 mm, 3 mm, 4 mm, 5 mm and so on, which is related to the distance between the vacuum holes. Optionally, the lengths of the evacuating slots on the six prismatic faces of the shunt rod 30 may be 20 mm, 25 mm, 30 mm, 35mm, 40 mm and 45 mm, respectively. The lengths of the evacuating slots 32 on each prismatic faces 31 of another shunt rod 30 having six prismatic faces may be 50 mm, 55 mm, 60 mm, 65 mm, 70 mm and 75 mm, respectively. In addition, the shape of each shunt rod 30 may be various. In addition, although in the present embodiment, the lengths of the plurality of evacuating slots 32 are successively increased by a predetermined length, it is understood that such a length difference may be non-uniform. In addition, although it is mentioned herein that the length of each evacuating slot 32 is not the same, it should be understood that there may be two or more of the plurality of evacuating slots 32 which are of a same length. It is not necessary to provide an evacuating slot 32 on every one of prismatic faces 31, while it is possible that some of the prismatic faces 31 are not provided with an evacuating slot 32, without departing from the scope of the present disclosure.

Referring again to FIGS. 1a-1c and FIGS. 3a-3c, in the present embodiment, the connecting device comprises a shunt connector 20 which is detachably arranged between the fake head body 10 and the shunt rod 30. The shunt connector 20 has a shunt connector body 21, a second vacuum suction hole 22, a plurality of second vacuum holes 26, a first fastening portion 24 for detachably fastening with the fake head body 10, and a second fastening portion 25 for detachably fastening with the shunt rod 30. The second vacuum suction hole 22 corresponds to the first vacuum suction hole 12 for communicating the first vacuum suction hole 12 with the evacuating slot 32, and further passing vacuum between the first vacuum suction hole 12 and the corresponding evacuating slots 32 of the shunt device. The plurality of second vacuum holes 26 correspond to the plurality of first vacuum holes 16 one by one for communicating the evacuating slots 32 with the first vacuum holes 16 and further passing vacuum between the evacuating slots 32 and the first vacuum holes 16.

Optionally, both the first fastening portion 24 and the second fastening portion 25 may be a threaded hole so that the first fastening portion 24 may be in threaded connection with the corresponding fastening portion 14 of the fake head body 10 by bolts 50, and the second fastening portion 25 may be in threaded connection with the corresponding fastening portion 33 of the shunt device by screws 40. The respective fastening portions 14 of the fake head body 10 as well as the corresponding first fastening portions 24 and screws 50 are shown in FIG. 1b to be six, although it should be understood that their numbers may be different and the mounting positions may also be different. In addition, although only one fastening portion 33 of the shunt device for connecting to the shunt connector 20 is provided on each prismatic faces 31 as shown in FIGS. 1a and 4c, it is to be understood that the number of the fastening portion 33 may be changed and the position thereof can also be changed.

Figure 5A:
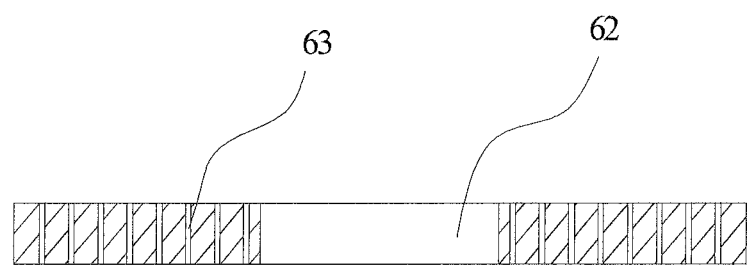
FIG. 5a is a cross-sectional view of the gasket shown in FIG. 1c in its longitudinal direction (i.e., the first direction) from its transverse midpoint.
Figure 5B:
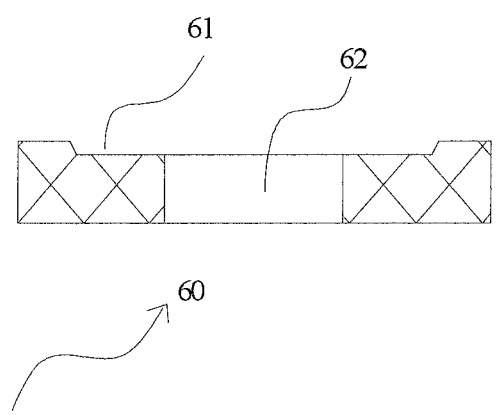
FIG. 5b is a cross-sectional view of the gasket shown in FIG. 1c in its transverse direction (i.e., in a direction perpendicular to the first direction) from its longitudinal midpoint.

Alternatively, in the present embodiment, an elongate channel 23 for mounting the shunt device is provided on the surface of the shunt connector 20 toward the shunt device. Optionally, as shown in FIGS. 5a and 5b, the connecting device further comprises a gasket 60 mounted in the elongate channel 23 to support the shunt device. The gasket 60 has, for example, a first side facing the elongate channel 23 and a second side opposite to the first side. The gasket 60 may also comprise a trapezoidal support groove 61 provided on the second side so as to be fitted with the shunt device. The spacer 60 may also comprise a plurality of third vacuum holes 63 and a third vacuum suction hole 62. The plurality of third vacuum holes 63 correspond to the plurality of second vacuum holes 26 of the shunt connector 20 one by one for communicating the evacuating slot 32 and the second vacuum hole 26, and further passing vacuum between the evacuating slot 32 and the second vacuum holes 26. The third vacuum suction hole 62 corresponds to the second vacuum suction hole 22 for communicating the second vacuum suction hole 22 with the evacuating slot 32, and further passing vacuum between the second vacuum suction hole 22 and the corresponding evacuating slots 32 of the shunt device.

Optionally, the second vacuum suction hole 22 and the third vacuum suction hole 62 have the same structure as the first vacuum suction hole 12. Of course, the structure of the first vacuum suction hole 12, the second vacuum suction hole 22 and the third vacuum suction hole 62 may be different depending on the specific situation. In addition, although the first vacuum hole 16, the second vacuum hole 26, the third vacuum hole 62 and the additional vacuum holes 18 are arranged in intervals in the longitudinal direction of the fake head assembly 100, it should be understood that, they can be arranged in other suitable directions depending on the specific situation.

In addition, although the fake head body 10 is shown in FIGS. 1a-1c to be connected to the shunt device by a connecting device including the shunt connector 20, it should be understood that the form of the connecting device may vary, for example, the shunt device may be connected directly to the engage face of the fake head by means of screws or other appropriate connecting device.

It will be apparent that various different variations and/or improvements and/or combinations of different embodiments of the present disclosure will be apparent to those skilled in the art without departing from the scope of the invention as defined by the appended claims.

What is claimed is:
1. A fake head assembly, comprising
a fake head body having an engage face,
a first vacuum suction hole configured to be connected to an evacuating device to perform an evacuation, an adsorption portion having an adsorption surface, a plurality of first vacuum holes inside the fake head body, each first vacuum hole including a first end on the adsorption surface and a second end on the engage face, the plurality of first vacuum holes being arranged in order in a first direction of the fake head assembly;
a shunt device detachably connected to the fake head body, the shunt device having a plurality of evacuating slots which extend in the first direction and have different extension lengths; the first vacuum suction hole being closable by the shunt device and selectively communicated with one evacuating slot, so as to be communicated the second end of at least some of the first vacuum holes via the one evacuating slot; and
a connecting device for connecting the shunt device to the engage surface of the fake head body.

2. The fake head assembly according to claim 1, wherein the fake head body further comprises at least one additional vacuum hole extending between the adsorption surface and a wall of the first vacuum suction hole.

3. The fake head assembly according to claim 1, wherein the shunt device comprises a shunt rod having a plurality of prismatic faces, at least some of which are provided with evacuating slots of different lengths.

4. The fake head assembly according to claim 3, wherein the shunt device is provided with a plurality of the shunt rods and the fake head body is selectively connected to one of the plurality of shunt rods.

5. The fake head assembly according to claim 1, wherein the connecting device comprises a shunt connector detachably arranged between the engage surface of the fake head body and the shunt device; and
the shunt connector comprises a second vacuum suction hole aligned with the first vacuum suction hole, the second vacuum suction hole serving for communicating the first vacuum suction hole with the evacuating slot; a plurality of second vacuum holes aligned with the plurality of first vacuum holes one by one, the plurality of second vacuum holes serving for communicating the evacuating slot with the first vacuum holes;
a first fastening portion for detachably fastening with the fake head body; and
a second fastening portion for detachably fastening with the shunt device.

6. The fake head assembly according to claim 5, wherein an elongate channel for mounting the shunt device is provided on the surface of the shunt connector which faces the shunt device.

7. The fake head assembly according to claim 6, wherein the connecting device further comprises a gasket mounted in the elongate channel to support the shunt device, the gasket comprising:
a first side facing the elongate channel and a second side opposite the first side;
a trapezoidal support channel provided on the second side of the elongate channel so as to be fitted with the shunt device;
a third vacuum suction hole aligned with the second vacuum suction hole, the third vacuum suction hole serving for communicating the second vacuum suction hole with the evacuating slot;
a plurality of third vacuum holes aligned with respective second vacuum holes of the shunt connector one by one, the plurality of third vacuum holes serving for communicating the evacuating slot with the second vacuum holes.

8. The fake head assembly according to claim 7, wherein the first vacuum suction hole, the second vacuum suction hole and the third vacuum suction hole comprise a plurality of through holes arranged in order in the first direction.

9. The fake head assembly according to claim 2, wherein the first vacuum suction hole is arranged in the middle part of the false head body and the additional vacuum hole(s) is(are) interposed in the middle of the plurality of first vacuum holes in the first direction.

10. The fake head assembly according to claim 1, wherein the false head body comprises a substantially rectangular body which has a first surface, a second surface opposite to the first surface, and a third surface between the first surface and the second surface, wherein the engage surface forms at least a part of the second surface, the adsorption portion projects outwardly from the third surface, and the adsorption surface is perpendicular to the engage surface.

\* \* \* \* \*